United States Patent [19]

Tiedemann et al.

[11] Patent Number: 5,173,374

[45] Date of Patent: Dec. 22, 1992

[54] EXPLOSION ATTENUATION SYSTEM AND METHOD FOR ASSEMBLY IN BATTERY

[75] Inventors: William H. Tiedemann, Cedarburg; Richard R. W. Binder, Menomonee Falls; Daniel J. Cantillon, Sussex; Allen C. Chapman, Milwaukee; Guy D. McDonald; Bryan L. McKinney, both of Shorewood, all of Wis.; John Newman, Kennington, Calif.; Richard C. Stone, Milwaukee, Wis.

[73] Assignee: Globe-Union, Inc., Milwaukee, Wis.

[21] Appl. No.: 667,970

[22] Filed: Mar. 12, 1991

[51] Int. Cl.$^5$ .............................................. H01M 2/12
[52] U.S. Cl. ...................................... 429/53; 429/57; 429/86; 29/623.4
[58] Field of Search ...................... 429/53, 57, 58, 82, 429/86-89; 29/623.1, 623.4, 623.2, 730

[56] References Cited

U.S. PATENT DOCUMENTS

| | | |
|---|---|---|
| 2,341,382 | 2/1944 | Jensen . |
| 3,561,639 | 2/1971 | Allen . |
| 3,650,431 | 3/1972 | Stewart . |
| 3,846,178 | 11/1974 | Evjen . |
| 4,004,067 | 1/1977 | Briggs et al. . |
| 4,141,460 | 2/1979 | Stanistreet et al. . |
| 4,154,357 | 5/1979 | Sheard et al. . |
| 4,751,154 | 6/1988 | Binder et al. . |
| 4,751,155 | 6/1988 | Binder et al. . |
| 4,859,546 | 8/1989 | Binder et al. . |

Primary Examiner—Anthony Skapars
Attorney, Agent, or Firm—Foley & Lardner

[57] ABSTRACT

An electric storage battery according to the invention has a porous explosion attenuating material disposed within a head space of the battery case over the electrode elements. The attenuating material forms a layer or lining on the inner surface of the top wall of the case, and preferably also on the inner surface of the upper ends of each side wall between the electrode elements and the top wall. The interior of the head space remains open. Such an explosion attenuating material is effective to limit pressure build-up resulting from ignition of said gases within the case.

20 Claims, 2 Drawing Sheets

EXPLOSION ATTENUATION SYSTEM AND METHOD FOR ASSEMBLY IN BATTERY

TECHNICAL FIELD

This invention relates to electric storage batteries or cells and, in particular, to an improved system for attenuating an explosion of combustible gases which accumulate in the head space of electric storage batteries.

BACKGROUND OF THE INVENTION

Many batteries generate combustible gases during operation. These gases are either vented from the battery container into the atmosphere or recombined within the battery in secondary reactions with the active materials. However, even in batteries which provide for internal recombination of combustible gases, there are operating circumstances in which the recombination mechanism is ineffective and significant volumes of combustible gases are generated. Combustible gases within the head space of a battery may be accidentally ignited and result in an explosion. The damage and injury resulting from such explosions are well documented. Thus, for many years, effective and practical means have been sought for preventing or minimizing explosions in batteries and the hazardous effects thereof.

Combustible gases which are generated within a battery, if not effectively recombined, will eventually create a high internal pressure To alleviate this pressure, these gases must be vented to the atmosphere. Venting is typically accomplished through the use of a simple open vent slot or a one-way relief valve, sometimes referred to as a "burp" valve. During venting of combustible gases, an external source of ignition, such as a flame or spark near the battery vent, can result in an ignition which will propagate back into the battery container and result in an explosion. Improvements in relief valve construction and the development of flame arrestors used in conjunction with vents have considerably decreased the incidence of battery explosions caused by external ignition sources, provided that such protective devices have not been removed or disabled, or that the integrity of the container or cover has not otherwise been breached.

However, should an external source of ignition breach one of the protective devices, or should an ignition occur within the container, the combustible gases in the head space may explode. The concentration of gases, typically a mixture of hydrogen and oxygen in a lead-acid battery, and the relatively large volume of the head space can result in an explosion which will shatter the container, cover or other components. In addition, the explosion will also often carry with it the liquid acid or other hazardous electrolyte from within the container.

Thus, materials and methods for suppressing or minimizing the effects of explosions within batteries have been long sought. Elimination of the open head space, or substantially filling it with a solid material, would virtually eliminate the possibility of an explosion simply because the presence of combustible gases would be eliminated. However, neither alternative is acceptable. An open head space is necessary in virtually all secondary storage batteries. The head space accommodates certain essential battery components, such as plate straps, intercell connectors, or terminals. In addition, in batteries which utilize free liquid electrolyte, sometimes referred to as "flooded" systems, open head space is necessary to accommodate variations in the level of the electrolyte as the battery is cycled, or to provide space for acid movement under extreme conditions of use, such as abusive overcharge. The head space also accommodates movement of the electrolyte level as the battery is tilted in service, such as the ability to operate an automobile on an incline without loss of electrolyte. Thus, due to the need to accommodate certain structural components of the battery and to provide space for electrolyte level fluctuations, the head space in batteries must be maintained.

For years, it has been known to fill the head space in a battery or cell with a porous material to inhibit the explosion of gases within the head space and quench any flame which may be formed, while still allowing the movement of gases and electrolyte through the material. See, for example, Jensen U.S. Pat. No. 2,341,382 issued February, 1944. Other forms of explosion attenuating material have also been proposed. Evjen U.S. Pat. No. 3,846,178 issued Nov. 5, 1974, discloses fitting pieces of closed cell foam into the battery cover and between cells. More recently, commonly-assigned patents provide an explosion attenuating material comprising closely packed pillows made of a foam or a fibrous material such as polypropylene. See Binder et al. U.S. Pat. Nos. 4,751,154 and 4,751,155, issued Jun. 14, 1988, and 4,859,546, issued Aug. 22, 1989. Lining the gas storage chamber of an electrochemical cell has been described in Briggs et al., U.S. Pat. No. 4,004,067 issued Jan. 18, 1977, but only for the purpose of recondensing vaporized electrolyte.

Porous plastic materials have also been used in fuel tanks or similar containers as a means for reducing explosion hazards. See, for example, Allen U.S. Pat. No. 3,561,639 issued February, 1971, Stewart U.S. Pat. No. 3,650,431 issued March, 1977, Funistric, et al. U.S. Pat. No. 4,141,460 issued February 1979, and Sheard et al U.S Pat. No. 4,154,357 issued February, 1979.

A number of factors are believed to have generally inhibited the practical application of explosion attenuation technology in batteries. These include the creation of other hazards, manufacturing difficulty, and detrimental effects on battery performance. Particularly in flooded batteries, the loss of actual open head space volume lessens the space available for electrolyte movement or electrolyte level variations.

It is known that high rate charging or excessive overcharge can result in vigorous gassing in many types of batteries, particularly lead-acid batteries. If the gas bubbles formed in the electrolyte cannot find fairly direct channels to the battery vent openings, electrolyte may be upwardly displaced and overflow through the battery vents. This condition is known as electrolyte pumping. The damaging and hazardous effects of a corrosive electrolyte flowing out of a battery are obvious.

Electrolyte pumping can also occur even where the head space of the battery is filled with a very highly porous material, i.e., a material having a high void volume. For example, an open or closed cell foam material may have a void volume as high as 97 to 99% and, if placed in the head space of a battery, will only occupy about 2 or 3% of the total volume thereof. Nevertheless, in a flooded battery, such a material may readily retain electrolyte and not allow it to drain back into the battery by gravity. Electrolyte so retained in a porous filler material will be readily pumped from the battery under the conditions of vigorous gassing described above.

Further, if a relatively large volume of electrolyte is drawn from the cells through wicking by a porous material in the head space, or if the porous material otherwise retains the electrolyte with which it comes into contact, insufficient electrolyte may remain in the cells for proper electrochemical reaction and operation of the battery.

In the explosion attenuating materials disclosed in the foregoing patents to Binder et al., certain materials which attenuate explosions and quench the flames resulting from the ignition of combustible gases do not perform well in other aspects of battery operation. The violence of an explosion (in terms of the peak pressure developed within the open head space of a battery) can be reduced by filling the head space with certain types of porous materials. The pressure developed during an explosion is reduced as the pore size of the attenuation material is decreased. Unfortunately, as the pore size of the material decreases, the adverse effects of the material on battery performance increase. The smaller the pore size of the material, the greater the propensity of the material to wick up electrolyte, i.e., to retain within the pores electrolyte with which it is wetted.

Absorbed electrolyte cannot drain back into the cell and can result in two serious problems. First, electrolyte retained in the porous material is not readily available for electrochemical reaction, thus diminishing electrical performance of the battery. Second, retained electrolyte will inhibit the flow of gases generated within the battery and, in certain circumstances of operation, result in electrolyte being pumped out of the battery through the vent openings. The use of compacted pieces of explosion attenuating material and the need to fill the head space with such pieces also renders the configurations suggested in the Binder et al. patents difficult to use. The present invention addresses these problems.

SUMMARY OF THE INVENTION

An electric storage battery according to the invention includes a battery case having a top wall, a bottom wall, and side walls, electrode elements disposed within the container, an electrolyte in contact with the electrode elements, and a porous explosion attenuating material within the head space of the case over the electrode elements. The attenuating material forms a layer or lining on the inner surface of the top wall of the case and preferably also on the inner surface of the upper ends of each outer side wall of the container between the electrode elements and the top wall. The remainder of the head space remains essentially open. Contrary to the teaching of the prior Binder et al. patents, such an explosion attenuating material is effective to limit pressure build-up resulting from ignition of gases within the container. This results from maintaining continuous intimate contact between the attenuation material and the outer casing A vent for venting gases generated by electrochemical reactions within the case can extend through the lining of explosion attenuating material, eliminating problems with electrolyte spewing encountered when the attenuating material covers the vent.

The invention further provides a method for lining the inside of the head space of an electric storage battery to provide the battery with an explosion attenuating material.

BRIEF DESCRIPTION OF THE DRAWINGS

The invention will be further described with reference to the accompanying drawings, wherein like numerals denote like elements, and.

DETAILED DESCRIPTION OF THE PREFERRED EMBODIMENTS

The present invention is based on the discovery that lining the interior walls of a battery head space with explosion attenuating material provides sufficient explosion attenuation under most conditions even though the interior of the head space remains open. This is highly unexpected in light of prior theories on how foam or fibrous materials attenuate hydrogen-oxygen explosions in batteries.

First, it was assumed that explosions or at least the chain reactions leading to explosion were quenched by surface recombination of chain initiators, in this case hydrogen atoms. However, it has been determined according to the present invention that such surface quenching will be effective only at much lower pressures than are present in the head space during an explosion. At atmospheric or elevated pressure, as exists within the head space during an explosion, it is more likely for hydrogen atoms to collide with hydrogen or oxygen molecules than the surface of the material. Therefore, surface area is no longer thought to be a critical factor, despite experimental data suggesting otherwise.

Second, the Binder et al. patents cited above suggest that the material divides the head space chamber into many minute cells which prevents rapid total combustion and produces instead a series of weak minor explosions. This theory of chain termination would weigh against leaving a large portion of the head space open, as in the present invention. It appears, however, chain termination notwithstanding, to be of primary importance with respect to limiting fracturing of the end walls and top wall, to have substantially continuous intimate contact between the attenuation material and the outer walls and top wall to be protected.

It is now believed that the foam or fibrous material plays two different roles in attenuation. The presence of such a material imposes a viscous drag which (1) prevents the development of high pressure waves and also (2) absorbs or disrupts secondary (primary reflectance) waves that coalesce to form high pressure or detonation waves. Highly porous material, approximately 85-95% porous, can be viewed as rows of regularly spaced columns which are offset or misaligned from each other. As the number and density of rows increase, the drag on the shock wave increases and the pressure wave spreads out. This results in the impulse at the wall being spread out over a longer time with a resultant lowering in amplitude. Slowing the event allows the force imparted to the wall to be redistributed in the axial direction of the wall instead of being absorbed perpendicular to the wall by bending and fracturing the container. The method of lining according to the invention thus acts to attenuate explosions by creating a viscous drag and absorbing secondary waves, thus preventing high pressure buildup.

Figure 1:
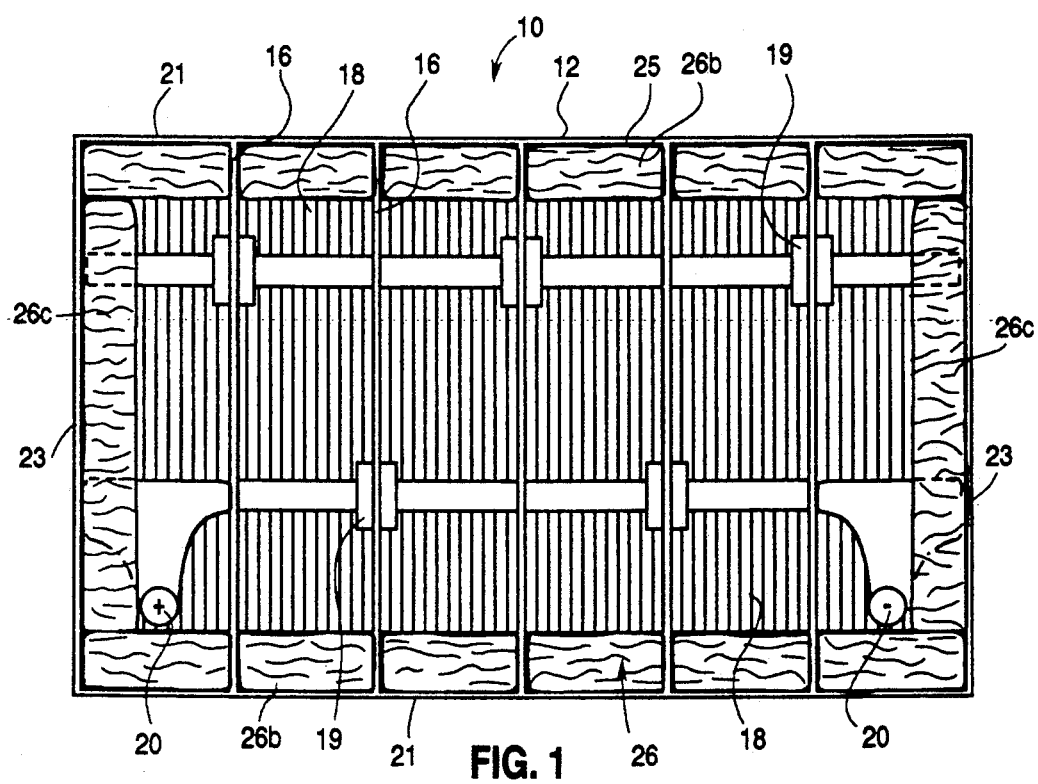
FIG. 1 is a top plan view of a battery according to the invention with the cover removed.
Figure 2:
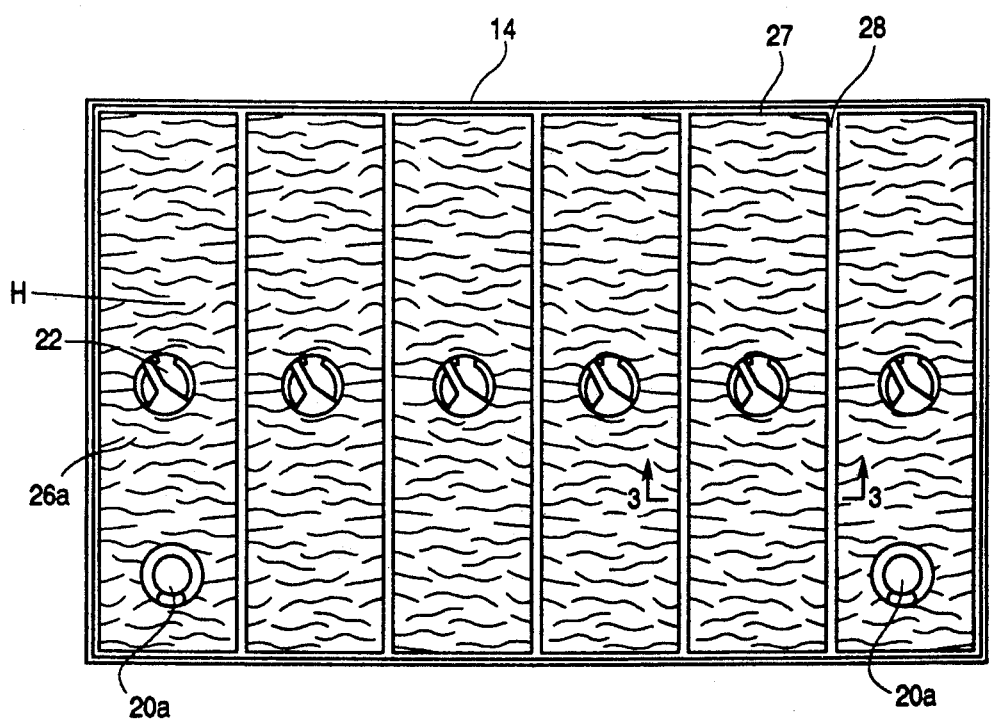
FIG. 2 is a bottom plan view of a cover according to the invention which fits over the battery shown in FIG. 1.

Referring now to FIGS. 1 and 2, a lead-acid SLI battery 10 of the invention includes a plastic battery case assembled from a container 12 and cover 14. Container 12 and cover 14 are typically made of thin, injection molded polypropylene. Container 12 is divided into a series of cells by spaced, integrally molded, parallel partition walls 16. Each cell contains an electrode element 18 constructed of a stack of alternating positive and negative plates spaced apart by separators, all in a manner well known in the art. The electrode elements 18 within each cell also include conventional lug and strap connectors (not shown). Adjacent electrode elements are series connected through the cell partitions 16 by conductive intercell connectors 19. The end cells of the battery 10 include connections to exterior terminals 20 through the cover 14 at holes 20a. Cover 14 includes a series of vent/fill hole inlets 22, one for each cell. Inlets 22 are closed with vent cap assemblies (not shown), which may be fixed or removable.

In the assembly of a typical lead-acid battery of the foregoing construction, the assembled electrode elements 18 are placed in the cells of the battery, the intercell connections between adjacent electrode elements are made through the partitions 16 and the terminal connections are made. Cover 14 is then sealed to the container 12. Each of the cells is filled with a sulfuric acid electrolyte to a level slightly above the tops of the electrode elements 18. The battery is then formed by electrochemically converting basic lead sulfates in the positive and negative plates to lead dioxide and lead. Except for the space occupied by the plate straps, intercell connectors and terminal assemblies, previously mentioned, the head space H (FIGS. 3A, 3B) within each cell above the top of electrode elements 18 and below the underside of cover 14 is open.

In such a conventional lead-acid battery, hydrogen and oxygen gases generated as a result of the electrochemical reactions within the cells pass upwardly from electrode elements 18 and accumulate in head space H until a sufficient positive pressure is established to cause the gases to vent through the vent holes 22 in cover 14, past the flame arrestors or other vent construction. The gas mixture is, of course, highly explosive, and an ignition of such gases accumulating in the open head space will result in an explosion which can easily shatter container 12 and cover 14, as well as other elements connected thereto. In addition to destroying the battery, the potential personal danger from exploding battery pieces and acid electrolyte is well known.

According to the invention, the inner surfaces of head space H are lined with an explosion attenuating material 26. In the illustrated embodiment, cover 14 is lined with a rectangular layer 26a of an explosion attenuating material. Upper end portions of container along side walls 21 and end (short side) walls 23 have generally rectangular pieces 26b of attenuating material bonded thereto. Each piece 26b spans adjacent partitions 16 or end wall 23, and covers the exposed portion of the associated side wall 21 above cell elements 18 up to about the level of the container rim 25. A pair of end pieces 26c line the exposed length of end walls 23 in like manner. Complete coverage of all exposed interior wall surfaces in head space H is preferred. If pieces 26b, 26c are omitted and only layer 26a is used, for example, the cover will remain intact during an explosion but side or end wall(s) of container 10 will often blow out.

In the illustrated embodiment, material 26 is made of polypropylene fiber batts having a thickness in the range of about 0.25 to 1.5 inches, preferably 0.5 to 1.0 inches. These thicknesses are preferred in current automotive lead-acid battery applications. In other battery types and sizes, thicknesses may vary. These thickness ranges are generally preferred for polypropylene and the other materials discussed below in order to provide sufficient protection for the inner surfaces of container 12 and cover 14 within head space H, without filling the head space to the point that electrolyte drainage and gas management become a problem as in the filled head spaces of the foregoing Binder et. al. patents.

Attenuation material 26 according to the invention should be resistant to the electrolyte under conditions typically encountered during battery use, i.e., at temperatures ranging from $-30$ to $60°$ C., and retain its structural integrity even after repeated ignitions within the battery head space. Attenuation material 26 should also be sulfuric-acid resistant if intended for use in a lead-acid battery, and resilient enough to return to its original shape after compressive distortion. In general, it should be capable of attenuating explosions, but have adequate chemical stability against dissolution or other degradation within the cells.

For these purposes, attenuation material 26 preferably comprises an open-celled foam or lofted fibers made of polyalkylenes, particularly polypropylene and cross-linked polyethylene, or fiberglass Needle-punched polypropylene fibers (washed if needed to remove lubricant), melt-blown polypropylene fibers, and polypropylene foams are most preferred. Fibrous polypropylene is particularly well suited for use in a wide variety of flooded secondary systems, both acid and alkaline. Polypropylene is stable and essentially insoluble in aqueous sulfuric acid solutions used in lead-acid batteries. In flooded alkaline systems, typically utilizing an aqueous potassium hydroxide electrolyte, polypropylene resists degradation. Thus, although a variety of cellular and fibrous plastics are suitable for use as explosion attenuation materials in lead-acid batteries, polypropylene is best suited for use in acid and alkaline systems, considering effectiveness, cost and stability.

Other materials such as fiberglass and open-celled polyurethane foam may be used instead of polypropylene as explosion attenuating material 26. Polyethylene can also be used, but does not survive as well in the high temperatures of the head space environment.

Attenuation material 26 preferably absorbs and retains from about 0.1 to about 5 ml, most preferably 1 to 4 ml, of electrolyte per gram of fibers during normal use. When the amount of absorbed electrolyte is within the latter range, the attenuating material can survive repeated ignitions. In a dry state, i.e., with less than about 0.1 g/ml of the vaporizable liquid electrolyte, the attenuating material can survive only 1 or 2 ignitions.

The fineness of the fibers of the attenuation material affects the amount of electrolyte it will retain. In particular, material 26 is preferably made of a blend of first, fine fibers and second, coarse (heavy) fibers. The first fibers preferably have a fineness in the range of about 5 to about 40 denier, whereas the second fibers have a fineness in the range of about 30 to about 120 denier. Denier combinations of 15/30, 20/40, 25/50, 15/60, 20/80 are representative. Preferred fiber size subranges are 10-30 denier, especially 10-20 denier for the fine fibers, and 30-100 denier, especially 40-80 denier for the heavy fibers. As an alternative, material 26 can be made of fibers having a uniform fineness in the range of about 30-40 denier.

The heavy and fine fibers are preferably interspersed substantially uniformly among each other to form material 26. The fine fibers provide enhanced explosion attenuation, and the heavy fibers allow drainage of the electrolyte, although the latter is less important if material 26 does not cover the open ends of vent/fill inlets 22. The attenuating material generally comprises 10-90 wt. % of the heavy fibers and 10-90 wt. % of the fine fibers. A roughly equal mixture, i.e., 40-60 wt. % of heavy fibers and 40-60 wt. % of light fibers, is most preferred. The density of the attenuating material is normally within 10-20 oz/yd$^2$ for a uniform thickness of about 0.5 inch.

In battery 10, head space H in one cell is approximately 1.5 by 1.5 by 6.5 inches, or approximately 14.6 cubic inches. The volume of head space occupied by material 26 (not taking porosity into account) ranges from 10% to 70%, especially 20 to 60%, and most preferably from 25 to 50% of this total. The unfilled interior of the head space reduces or eliminates the problems discussed above created by prior attenuation designs.

Attenuation material 26 is preferably bonded to the inside surfaces of head space H. Although pieces 26b, 26c will usually remain in position without bonding if properly sized, there is a tendency for pieces 26b, 26c to pull away from the container walls during assembly or use. If this happens, the uncovered portion of the wall is likely to blow out during an explosion. Accordingly, pieces 26b, 26c may be secured by any suitable means, such as heat bonding, ultrasonic vibration welding, an adhesive, or the like.

Figure 3A:
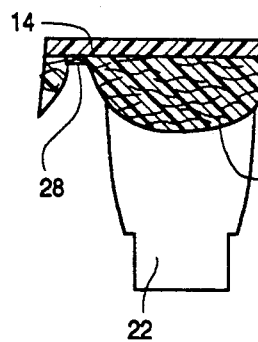
FIG. 3a is a lengthwise sectional view along a line 3—3 in FIG. 2, before assembly with the battery of FIG. 1.
Figure 3B:
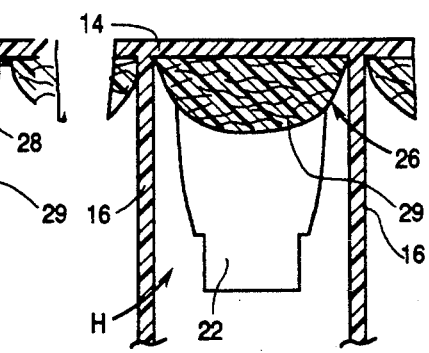
FIG. 3b is a lengthwise sectional view along a line 3—3 in FIG. 2, after assembly with the battery of FIG. 1.

Layer 26a is similarly secured to the inside surface of cover 14. Referring to FIGS. 2, 3a, and 3b, cover 14 fits over container 10 so that the inner surface of cover 14 is bonded to the upper ends of walls 21, 23 and partitions 16. For batteries having this structure, layer 26a is preferably secured by selectively bonding layer 26a to cover 14 along a thin outer peripheral zone 27 and along a series of widthwise lines 28 which are aligned with partitions 16. Prebonding layer 26a in this manner compresses the polypropylene fibers as shown in FIG. 3a. Cover 14 is then placed over container 10 as in the normal assembly procedure, and is bonded to container 10 at rim 25 and the upper ends of partitions 16. In this manner the fibrous material in areas 27, 28 fuses with the plastic of the container and cover, so that layer 26a becomes a series of elongated pillows 29 lining the top of the head space in each cell (FIG. 3b).

Figure 4:
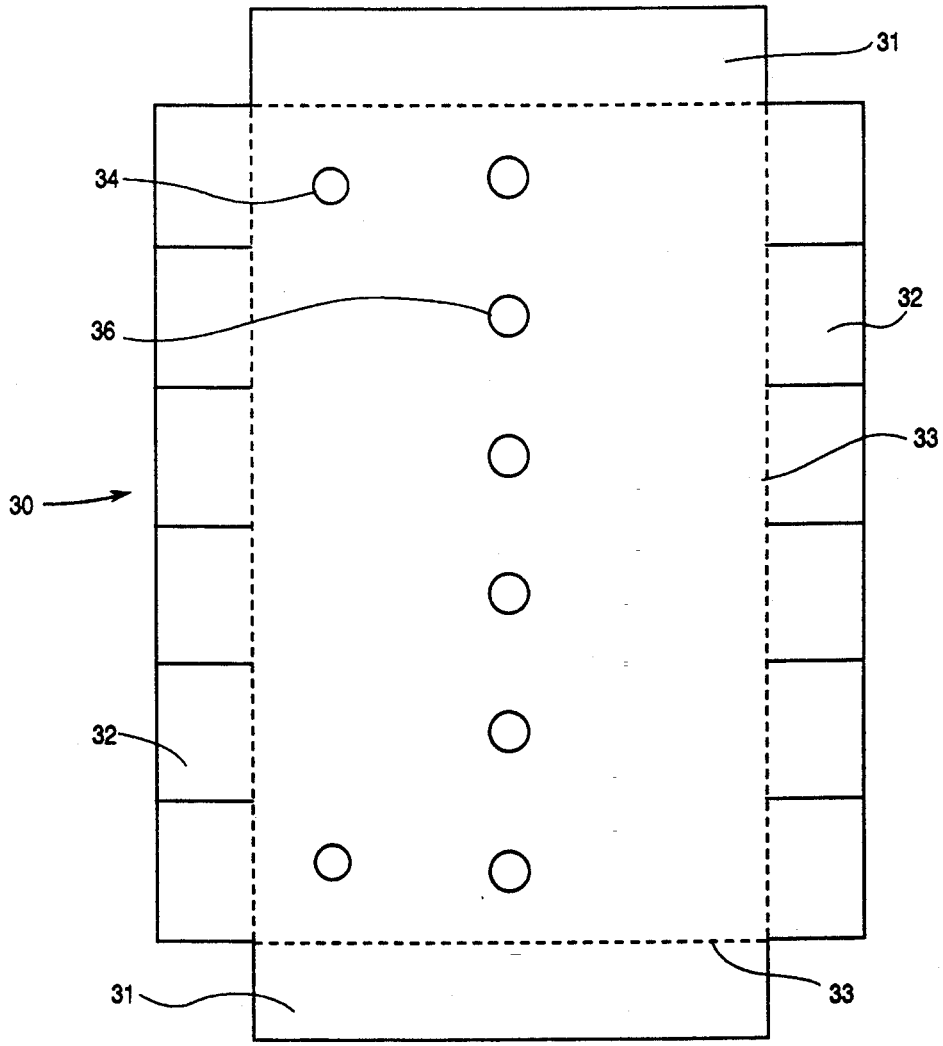
FIG. 4 is a top view of an insert made of explosion attenuating material according to the invention.

FIG. 4 illustrates a blank 30 made of attenuation material 26 which can be used in lieu of separate pieces 26a-c. Blank 30 is cut widthwise at spaced locations to provide six side flaps 32 on each side. Corners are cut away to similarly provide end flaps 31, and holes 34 and 36 provide for terminal post and vent/fill inlet penetration. Creases or perforations 33 may be provided to facilitate folding of flaps 31, 32. During assembly of the battery, flaps 31, 32 are tucked into the individual cells covering the side and end walls, and optionally bonded thereto. Cover 14 is then placed into position, and the battery is completed as described above.

Figure 5:
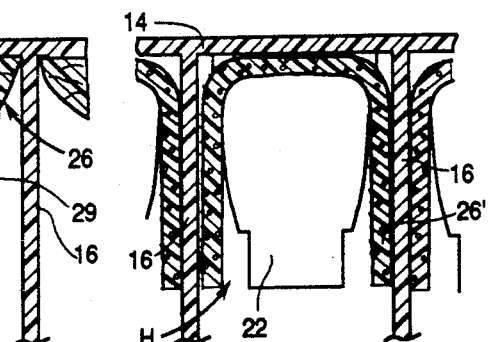
FIG. 5 is a partial sectional view of a battery head space filled with an alternative insert according to the invention.

To demonstrate the role of attenuation material 26 in damage reduction, a ¼" thick sheet 26' of polyurethane open cell foam (65 ppi) was folded over and placed in the head space of each cell of batteries so that the folded-over portion of the foam pressed against the cover of the battery as illustrated in FIG. 5. The quantity of foam used (160 cc) did not fill the head space (310 cc). Based on previous theories of explosion attenuation, little or no protection was expected with only about 50% of the head space filled. It was anticipated that the unprotected end wall would be blown out, that the pressure generated would be too high to be contained by the battery, and that multiple explosions would result in extensive melting and burning of the surface of the foam. The results are summarized as follows, wherein electrolyte level was either normal, approximately 0.5 inch above the plates, or just barely enough to cover the plates:

| Level | T °F. | Without Foam | With Folded Foam |
| --- | --- | --- | --- |
| Normal | 75 | Extensive fracturing of cover. Some end wall damage. Fragments ⅛" and greater. | Battery undamaged after multiple explosions. No end wall damage. Only failure was cover cracks. |
| Plate | 75 | Cover destroyed - large fragments. Destruction of end walls. | Cover cracks. Inter-cell walls broken. End walls undamaged. |
| Normal | −20 | Extensive top fragmentation. Many small fragments. | Inter-cell walls broken. One fragment was formed. |
| Plate | −20 | Case above plates destroyed. Many small fragments. | Extensive cover cracks. Several large fragments. |

Surprisingly, these results show that considerable protection is obtained with only a comparatively small amount of attenuation material selectively positioned in the battery. Further tests showed that a ⅛" thickness and a 55% fill reduced explosion intensity by 50-67%, and that areas (especially side walls) not covered were subject to blowout during an explosion.

A second series of tests showed that explosion attenuation according to the invention can be further improved by addition of an impact modifier to the cover. Useful impact modifiers for polypropylene battery containers and covers include rubbers and polyethylene. In these examples, the cover was a 50/50 blend of polypropylene and RAO-61. In Samples 1 through 4, 0.5 inch thick pieces of needle-punched polypropylene (50/50 blend of 15/60 denier fibers) were secured to the cover and container inner sidewalls above plate level as shown in FIG. 1. For Samples 5 through 7, only the inner surface of the cover was covered; inserts for protecting the side walls were omitted. In addition, the container for these samples was a 75/25 blend of polypropylene and RAO-61. Comparative Samples 8-13 were prepared by filling head spaces of batteries with 14 grams per cell of the same needle punched polypropylene (15/60 denier) in accordance with the procedure of Binder et al. U.S. Pat. No. 4,751,154. The results were as follows:

TABLE 2

| Sample | Ignitions | Test Results |
| --- | --- | --- |
| 1 | 4 | 3rd and 4th ignitions produced cracks along container and cover edge. No fragments. |
| 2 | 2 | 1st ignition produced crack along cover edge; 2nd ignition increased cover crack. |
| 3 | 5 | 5th ignition broke cover seal; cover lifted completely in cell 6. |
| 4 | 20 | 7th ignition produced slight cover crack. No further damage. |
| 5 | 2 | 2nd ignition formed large cracks in cover and container, cells 3, 4 and 6. |
| 6 | 2 | 2nd ignition - fragment blown out from container. |
| 7 | 1 | 1st ignition - large case crack in cell 6. |
| 8 | 20 | No visible damage. |
| 9 | 6 | 3rd ignition caused cover crack at cells 2, 3. Fragment blown out at 6th ignition. |
| 10 | 8 | 8th ignition formed crack along length of cover. |
| 11 | 7 | 4th ignition formed crack along cover edge. |
| 12 | 8 | 3rd ignition formed cover crack; more cracking at ignitions 5-8 in cell 6. |
| 13 | 5 | 5th ignition caused cover crack - cells 1-3. |

The results indicate that, with impact modification of the cover, the protection afforded by the method of the invention is comparable to the prior method which required completely filling the head space.

Minimal interference with normal head space operation according to the invention provides other advantages. For example, cell structures are not crowded, and adequate space exists to accommodate tilting, acid filling and overcharging. Battery performance is unaffected by the presence of the attenuation material. Production and assembly are simplified and economy enhanced with the use of less material.

The attenuation materials disclosed herein have been described for use in batteries having flooded electrolyte systems, whether acid or alkaline. Examples include nickel-zinc, lead-acid, nickel-cadmium, and hydrogen-nickel batteries. However, a variety of secondary storage batteries operate with an immobilized gelled electrolyte or with a so-called "starved" electrolyte system. During formation of these batteries or during unusual circumstances of use, such as inadvertent or abusive overcharge, both hydrogen and oxygen gas may be evolved. In batteries which utilize a gelled acid electrolyte, oxygen recombination is typically slower than in true recombination systems, and hydrogen is also more readily generated even under open circuit conditions. Thus, the explosion attenuation system of the invention is useful in non-flooded systems as well.

The attenuation materials according to the invention can also be used in a battery provided with a hydrostatic electrolyte pump as set forth in commonly assigned U.S. Pat. No. 4,963,444 issued Oct. 16, 1990, the entire contents of which are incorporated herein by reference. A filled head space diminishes the effectiveness of the hydrostatic pump. Batteries according to the invention are also particularly useful in electrically powered vehicles. Many electric car designs require a large number of batteries, magnifying the hazards of an explosion. It may also be desirable in certain battery applications to use open celled foams in certain areas of the battery in conjunction with closed cell foams or other materials in other areas of the battery.

While several embodiments in the present invention have been described in the foregoing specification, such descriptions and the drawings are for purposes of illustration and the invention is to be limited solely by the scope of the claims which are appended hereto.

We claim:

1. An electric storage battery, comprising:
   a case including a top wall, a bottom wall, and side walls;
   a plurality of electrode elements disposed within said case;
   an electrolyte in contact with said electrode elements within said case;
   a vent from said case for venting gases generated by electrochemical reactions within said case; and
   a porous, explosion attenuating material disposed within a head space of said case over said electrode elements, which explosion attenuating material is effective to limit pressure build-up resulting from ignition of said gases within said case, wherein said material forms a lining on the inner surface of the top wall of the case and on the inner surface of the upper ends of each side wall between the electrode elements and the top wall so that substantially the entire inner surface of the side walls and top wall of the case within the head space is covered by the explosion attenuating material, the interior of the head space remaining essentially open.

2. The battery of claim 1, wherein said attenuating material comprises a batt of fibers.

3. The battery of claim 2, wherein said fibers are made of polypropylene.

4. The battery of claim 1, wherein said battery is a lead-acid battery.

5. The battery of claim 1, further comprising means for bonding said attenuating material to said top and side walls.

6. The batter of claim 1, wherein said attenuating material has a thickness in the range of 0.25 to 1.5 inches and occupies from 10% to 70% of said head space, such that 30-90% of the head space volume is free of said material.

7. The battery of claim 1, wherein said attenuating material has a thickness in the range of 0.5 to 1 inch and occupies from 20% to 60% of said head space, such that 40-80% of the head space volume is free of said material.

8. A method of installing a lining of explosion attenuating material in an electric storage battery of the type having a substantially closed case, including a container and a cover which fits over an open upper end of the container, which cover has an inner surface which forms the top wall of the case, the container having a bottom wall, side walls and a series of spaced internal partition walls which define a series of cells, electrode elements and an electrolyte disposed within the cells, a head space between said electrode elements and said cover, and a pair of external terminals, which method comprises:
   securing a layer of explosion attenuating material to the inner surface of the cover;
   securing pieces of explosion attenuating material to each of the side walls at positions spanning adjacent cell partition walls above the electrode elements so that substantially the entire inner surface of the side walls and top wall of the case within the head space is covered by the explosion attenuating material, the interior of the head space remaining essentially open; and securing the cover to the container so that the head space is lined with the explosion attenuating material.

9. The method of claim 8, wherein said material is made of polypropylene fibers.

10. The method of claim 8, wherein said step of securing said layer of material further comprises bonding said layer to said inner surface along the outer periphery thereof and along a series of predetermined, spaced lines, and the step of securing the cover further comprises bonding the inner surface and the layer of explosion attenuating material to upper ends of each partition wall along said lines and the upper ends of each side wall along said outer periphery.

11. A lead-acid electric storage battery, comprising:
 a case including a container and a cover which fits over an open upper end of the container, which cover has an inner surface which forms the top wall of the case, the container having a bottom wall, side walls and a series of spaced internal partition walls which define a series of cells;
 a plurality of electrode elements disposed within said cells in said container;
 a sulfuric acid electrolyte in contact with said electrode elements within said container;
 intercell electrical connectors which connect said electrode elements in series;
 a pair of positive and negative external terminals connected to opposite ends of said series of electrode elements, which terminals extend out of the case;
 a vent from said case for venting gases generated by electrochemical reactions within said case; and
 a porous explosion attenuating material disposed within a head space of said case over said electrode elements, which explosion attenuating material is effective to limit pressure build-up resulting from ignition of said gases within said case, wherein said material forms a lining on the inner surface of the top wall of the case and on the inner surface of the upper ends of each side wall of the container between the electrode elements and the top wall in each cell compartment, so that substantially the entire inner surface of the side walls and top wall within the head space is covered by the explosion attenuating material, the interior of the head space remaining essentially open.

12. The battery of claim 11, wherein said attenuating material comprises a layer of attenuating material secured to said cover and a plurality of pieces of attenuating material each secured to the side walls of the container in each cell compartment.

13. The battery of claim 12, wherein said attenuating material comprises fiber batts.

14. The battery of claim 13, wherein said fibers consist essentially of polypropylene.

15. The battery of claim 12, wherein said partition walls span the width of the container and are spaced from each other in parallel positions, such that two endmost compartments contain three fiber pieces covering each of three side walls, and compartments between the two endmost compartments contain two fiber pieces in opposed positions covering each of two side walls.

16. The battery of claim 11, wherein said attenuating material has a thickness in the range of 0.25 to 1.5 inches and occupies from 10% to 70% of said head space, such that 30-90% of the head space volume is free of said material.

17. The battery of claim 14, wherein said attenuating material has a thickness in the range of 0.5 to 1 inch and occupies from 20% to 60% of said head space, such that 40-80% of the head space volume is free of said material.

18. The battery of claim 11, wherein said cover has inlets therein associated with each cell, which inlets penetrate through the lining on the inner surface of the top wall of the case.

19. The battery of claim 11, wherein the cover consists essentially of polypropylene and an amount of an impact modifier effective to improve the explosion resistance of the cover.

20. The battery of claim 19, wherein the impact modifier is rubber or polyethylene.

* * * * *